United States Patent [19]

Matsumiya

[11] Patent Number: 4,577,142

[45] Date of Patent: Mar. 18, 1986

[54] FINE FEED SYSTEM

[75] Inventor: Sadayuki Matsumiya, Kawasaki, Japan

[73] Assignee: Mitutoyo Mfg. Co., Ltd., Tokyo, Japan

[21] Appl. No.: 620,222

[22] Filed: Jun. 13, 1984

[30] Foreign Application Priority Data

Jun. 24, 1983 [JP]  Japan ................... 58-114751

[51] Int. Cl.⁴ .......................................... G05B 11/18
[52] U.S. Cl. .................................. 318/592; 318/593; 318/571
[58] Field of Search ...................... 318/592, 593, 571; 408/129; 324/207

[56] References Cited

U.S. PATENT DOCUMENTS 4,288,182  9/1981  Vandenkieboom et al. ........ 408/129
4,465,975  8/1984  Porter ................................ 324/207

Primary Examiner—William M. Shoop, Jr.
Assistant Examiner—Saul M. Bergmann
Attorney, Agent, or Firm—Flynn, Thiel, Boutell & Tanis

[57] ABSTRACT

A system for finely feeding a movable member being movable relative to a stationary member.

This fine feed system is constructed such that the movable member is provided with a fine feed mechanism, which includes a screwshaft and a nut member threadably coupled to the screwshaft and capable of being suitably clamped against the stationary member. A control device is provided for causing a driving motor to drive the screwshaft on condition that a detector to regulate the relatively movable range between the screwshaft and the nut member is not in operation, while, for causing the driving motor to operate so that the screwshaft and the nut member can return to original relative positions, on condition that the nut member is not clamped against the stationary member. The fine feed of the movable member can be instantaneously performed no matter where the movable member may be in its movable range.

14 Claims, 2 Drawing Figures

FINE FEED SYSTEM

BACKGROUND OF THE INVENTION

1. Field of the Invention

This invention relates to fine feed systems, and more particularly to a fine feed system suitable for finely feeding a movable portion of a measuring instrument or the like.

2. Description of the Prior Art

With general measuring instruments such as a coordinate measuring instrument and a projector, in order to improve the measuring efficiency as a whole, it is necessary to finely feed a touch signal probe holding member, a table having rested thereon a work to be measured and the like for example as occasion demands. For this, there are many cases where a fine feed system is switchable to and from a rough feed system.

Of the fine feed systems described, there are known the inventions disclosed in Japanese Utility Model Kokoku (Post-Exam. Publn) No. 33439/82, Japanese Utility Model Kokai (Laid-Open) No. 32412/83 and the like for example, which are mainly intended for the convenience in switching and obviating the backlashes. The invention disclosed in Utility Model Kokoku (Post-Exam. Publn) No. 33439/82 will hereunder be described with reference to the coordinate measuring instrument as shown in FIG. 1 attached thereto. The fine feed system is of such an arrangement that a movable member is feed by manual operation at high speed to a position directly in front of a work, a half nut is threadably coupled to a guide rod by the operation of a lever in the vicinity of the work, and, in this condition, a fine feed is performed by the operation of a control wheel. In this case, if the lever is returned after the measurement, then the threadable coupling between the half nut and the guide rod is released, so that the feed at high speed can be conducted again.

However, with the conventional system of the type described, in order to make it possible to finely feed the movable member no matter where the movable member may be, the above-described mechanism, such as the guide rod, should be provided over the whole stroke of the movable member, thereby presenting problems from the viewpoint of accuracy as well as economics. Furthermore, upon completion of the fine feed, the fine feed system should operate to be effect restoring to the original position to thereby be ready for the next measurement of the work, thus requiring the troublesome operation. Particularly, when the center-to-center dimension between a plurality of terminal holes formed in a printed circuit board and the like, if the aforesaid restoration operation is neglected, then a stroke limit occurs during the fine feed, whereby, after the fine feed is temporarily released, reengagement is needed, so that the measurement has been practically neglected from the viewpoint of the construction.

SUMMARY OF THE INVENTION

The present invention has been developed to obviate the disadvantages of the prior art and has as its object the provision of a fine feed system rendered compact in size and low in cost, in which the fine feed of a movable member can be instantaneously performed no matter where the movable member may be positioned in its range of movement.

The problems of the conventional system seem to be caused by the fact that a fine feed mechanism additionally functions as a means for engaging a counterpart. Therefore, according to the present invention, such an arrangement is adopted that the fine feed mechanism is independent of the engaging means, the former is secured to the movable member, the latter is formed into a clamp device for coupling or releasing the former to or from a stationary member, and the fine feed mechanism can be automatically returned to the original position when the clamp device is released.

More specifically, to the above end, the fine feed mechanism including a first member and a second member, which are movable relative to each other, is secured to the movable member, a driving means is provided on the first member, the clamp device for coupling the second member to the stationary member is provided on the second member, a control device is provided for operating the driving means on condition that a movement regulating detector for defining a range of relative movement between the first and the second members is not operated, while, for operating the driving means in a direction to return the first and the second members to original relative positions on condition that the clamp device is released.

DETAILED DESCRIPTION OF THE PREFERRED EMBODIMENT

Description will hereunder be given of an embodiment of the present invention with reference to the drawings.

Figure 1:
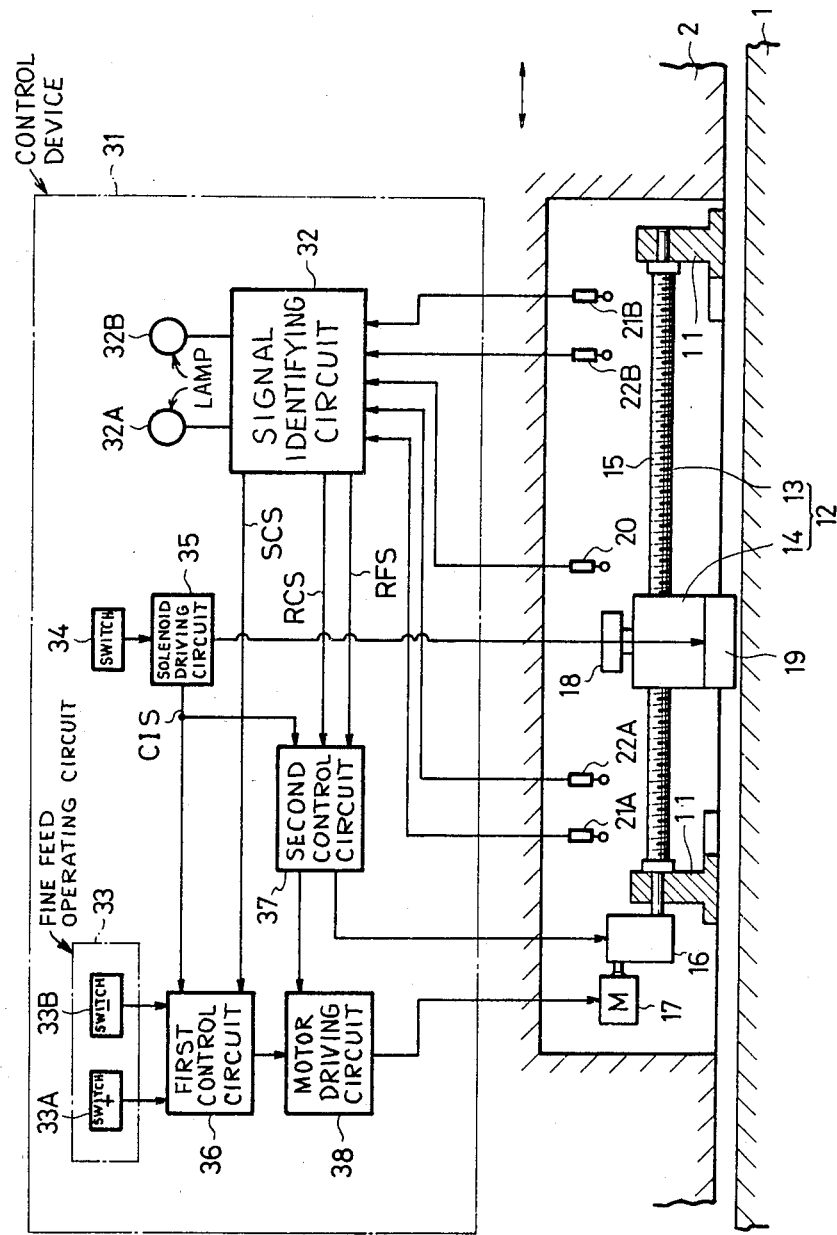
FIG. 1 is an explanatory view showing the general arrangement of an embodiment of the fine feed system according to the present invention.

FIG. 1 shows the embodiment of the fine feed system according to the present invention being applied to a movement portion in one direction of a coordinate measuring instrument provided with a positioning microscope. In the movement portion, a movable member 2 having a positioning microscope, not shown, is slidably provided in opposed relationship to a stationary member 1. Here, there is omitted a mechanism for smoothly sliding the movable member 2 relative to the stationary member 1 such for example as a guide rail, air bearing and the like. Furthermore, a movement value of the movable member 2 is detectable by a displacement detector, not shown.

A fine feed mechanism 12 is mounted through a support base 11 on a surface of the movable member 2, being opposed to the stationary member 1. The fine feed mechanism 12 includes a screwshaft 13 as the first member, being disposed in parallel to a moving direction of the movable member 2 and rotatably supported at opposite ends thereof on the support base 11, and a nut member 14 as the second member, being threadably coupled to this screwshaft 13. The screwshaft 13 is formed on the substantially whole outer periphery thereof with external threads 15 and connected thereto at one end portion thereof projected from the support base 11 via a speed change clutch 16 with a motor 17 as being a driving means. Furthermore, the nut member 14 is integrally formed at the top thereof with a switch actuating protrusion 18 and provided at the bottom thereof with a solenoid 19 as being a clamp device to be coupled to the stationary member 1 in an excited condition. The solenoid 19 is secured to be spaced a slight gap apart from the sliding surface of the stationary member 1 in non-excited condition. For this, in the non-excited condition of the solenoid 19, i.e. in a condition where the solenoid 19 is not coupled to the stationary member 1, the movable member 2 may be moved manually or automatically relative to the stationary member 1 to a desired position, and, when the motor 17 is driven, the nut member 14 is moved along the screwshaft 13 without being rotated relative to the screwshaft 13. Further, in the axial direction of the screwshaft 13, i.e. the moving direction of the nut member 14, there are provided a first switch 20, second switches 21A and 21B as being movement regulating detectors and third switches 22A and 22B as being position detectors, all of which are actuated by the switch actuating protrusion 18 of the nut member 14, in a manner to be adjustably movable in the axial direction of the screwshaft 13 and fixable at desired positions. The first switch 20 is affixed to the substantially central position in the axial direction of the screwshaft 13, for sensing a neutral position of the nut member 14. Furthermore, the second switches 21A and 21B are affixed at opposite end portions of the screwshaft 13, for sensing the movable range of the nut member 14. Further, the third switches 22A and 22B are affixed at positions slightly inwardly of the second switches 21A and 21B, for sensing the presence of the nut member 14 being short of the movable range of the nut member 14. Additionally, the distances between the second switches 21A, 21B and the third switches 22A, 22B are set to be smaller than the length of the switch actuating protrusion 18. In other words, even when the second switches are on, the third switches are kept on. Furthermore, sensing signals of these switches 20, 21A, 21B, 22A and 22B are fed to a control device 31.

The control device 31 includes: a signal identifying circuit 32 receiving the sensing signals from the switches 20, 21A, 21B, 22A and 22B as inputs; a fine feed operating circuit 33 having a plus direction fine feed operation switch 33A and a minus direction fine feed operation switch 33B; a solenoid drive operation switch 34 as being a clamp device driving circuit; a solenoid driving circuit 35 as being a clamp device driving circuit; a first control circuit 36; a second control circuit 37; and a motor driving circuit 38. The signal identifying circuit 32, when a sensing signal is delivered from the first switch 20, outputs a restoration completion signal RFS to the second control circuit 37, when sensing signals are inputted from the second switches 21A and 21B, outputs a stop command signal SCS to the first control circuit 36, and, when sensing signals are inputted from the third switches 22A and 22B, turns on or off either an alarm lamp 32A or 32B depending on this signal, i.e. the feeding direction of the movable member 2 and a restoration command signal RCS to the second control circuit 37. Furthermore, the solenoid driving circuit 35, when the solenoid drive operation switch 34 is turned on, excites the solenoid 19 and inverts a condition identification signal CIS to the first and the second control circuits 36 and 37 from the L level to the H level. The first control circuit 36, in a condition where no stop command signal SCS is inputted thereto from the signal identifying circuit 32 and the condition identification signal CIS from the solenoid driving circuit 35 is on the H level, i.e. the solenoid 19 is integrally coupled to the stationary member 1, when the plus direction fine feed operation switch 33A is turned on, drives via the motor driving circuit 38 the motor 17 in a plus rotational direction (a direction in which the screwshaft 13 proceeds relative to the nut member 14 to the right in FIG. 1 for example), and, when the minus direction fine feed operation switch 33B is operated, drives via the motor driving circuit 38 the motor 17 in the reverse direction. The second control circuit 37, when the condition identification signal CIS from the solenoid driving circuit 35 is inverted from the H level to the L level, discriminates the presence or absence of the restoration command signal RCS from the signal identifying circuit 32, when the restoration command signal RCS is present, gear-changes the speed change clutch 16 from low speed to high speed, and thereafter, drives via the motor driving circuit 38 the motor in the reverse direction until the restoration completion signal RFS is fed from the signal identifying circuit 32.

Figure 2:
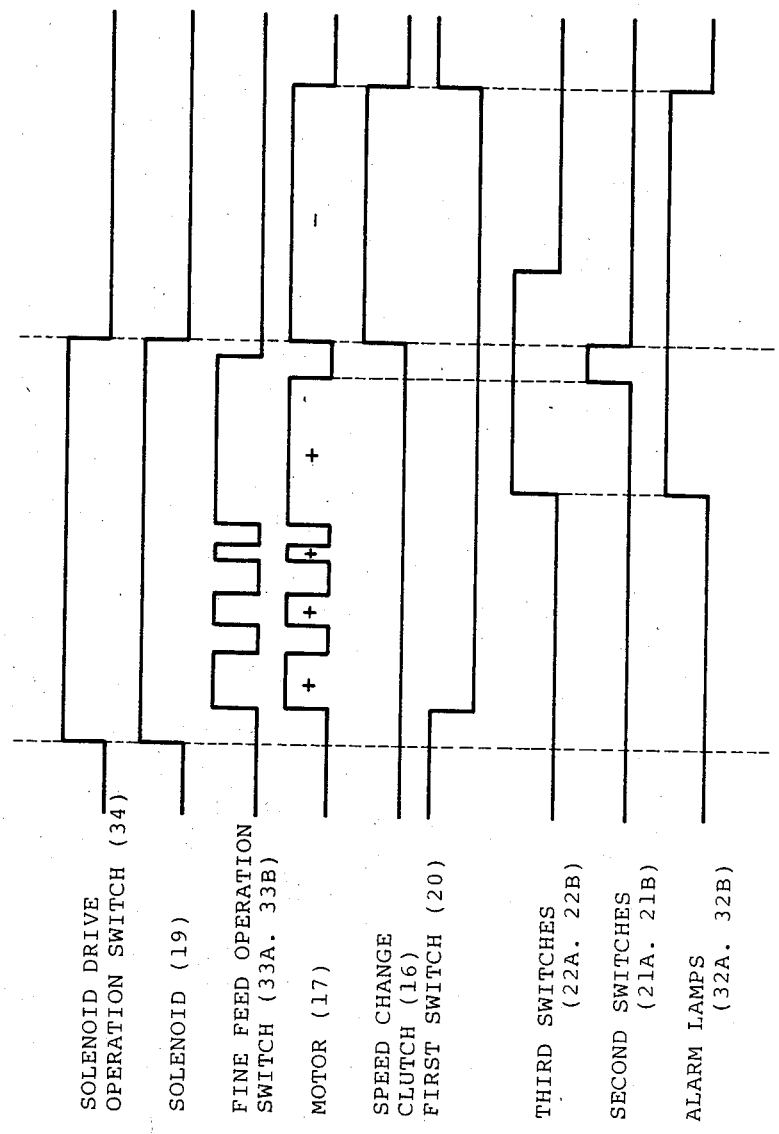
FIG. 2 is a timing chart.

Description will hereunder be given of action of this embodiment with reference to FIG. 2. In performing the measurement, the movable member 2 is manually or automatically moved relative to the stationary member 1, and positioned in the vicinity of a portion to be measured of the work. Here, if the solenoid drive operation switch 34 in turned on, the solenoid driving circuit 35 excites the solenoid 19 to integrally fix the nut member 14 to the stationary member 1 and feed the condition identification signal CIS of the H level to the first and the second control circuits 36 and 37.

Now, in a condition where the nut member 14 is at the substantially central position of the screwshaft 13, i.e. the switch actuating protrusion 18 of the nut member 14 is at the neutral position to turn on the first switch 20, if any one of the operation switches 33A and 33B, e.g. the plus direction fine feed operation switch 33A is pressed, then the first control circuit 36 judges the presence or absence of the stop command signal SCS from the signal identifying circuit 32 and as to whether or not the condition identification signal CIS is on the H level, respectively. In this case, the stop command signal SCS is not present and the condition identification signal CIS is on the H level, whereby the first control circuit 36 drives the motor 17 via the motor driving circuit 38 in the plus rotational direction. When the rotation of the motor 17 is imparted to the screwshaft 13 via the speed change clutch 16, the screwshaft 13 is finely fed relative to the nut member 14 to the right in FIG. 1, because the nut member 14 threadably coupled to the screwshaft 13 is integrally affixed to the stationary member 1. In other words, the movable member 2 is finely fed relative to the stationary member 1.

Then, the movable member 2 is moved by this fine feed, and, when a point to be measured of the work, e.g. a center of a terminal hole of a printed circuit board or the like is confirmed by the positioning microscope provided on the movable member 2, the plus direction fine feed operation switch 33A is turned off. Then, the motor 17 is stopped in operation, whereby the movable member 2 is stopped at its position. Here, if a value indicated by the displacement detector for detecting a movement value of the movable member 2 is read by a foot switch or the like for example, then the position of the movable member 2 is obtainable. The measurements to the succeeding points to be measured are successively performed by finely feeding the movable member 2 as described above.

Additionally, if a distance to the next point to be measured is larger than a fine feed stroke of the movable member 2, then the solenoid 19 is demagnetized by the off-operation of the solenoid drive operation switch 34, the coupling between the nut member 14 and the stationary member 1 is temporarily released. Thereafter, the movable member 2 is moved manually or automatically to a position in the vicinity of the next point to be measured in the same operation as that described above, and the measurement is performed. During this period of time, i.e. in the condition where the solenoid 19 is demagnetized and the movable member 2 is freely movable relative to the stationary member 1, even if the operation switches 33A and 33B are turned on, the motor 17 is not driven because the condition identification signal CIS at the L level is delivered from the solenoid driving circuit 35 to the first control circuit 36.

On the other hand, when either the third switch 22A or 22B, e.g. the third switch 22A is turned on by the switch actuating protrusion 18 of the nut member 14 due to the fine feed of the movable member 2, a sensing signal is delivered from the third switch 22A to the signal identification circuit 32 of the control device 31. Then, the signal identifying circuit 32 on-off operates the alarm lamp 32A to inform that there is little allowance in the stroke of the movable member 2 to the right in FIG. 1 and feed the restoration command signal RCS to the second control circuit 37. At this time, the fine feed of the movable member 2 to the right can be performed until the second switch 21A is turned on.

Now, if the movable member 2 is further finely fed in the same direction from the position where the third switch 22A has been turned on, then the second switch 21A is turned on by the switch actuating protrusion 18 of the nut member 14, and a sensing signal is delivered from the second switch 21A to the signal identifying circuit 32. Then, the signal identifying circuit 32 delivers the stop command signal SCS to the first control circuit 36, whereby the first control circuit 36 stops the operation of the motor via the motor driving circuit 38, so that the fine feed mechanism 12 may be prevented from being damaged.

Now, when the movable member 2 is finely fed to a position where the third switch 22A is on or a position where both the second and the third switches 21A and 22A are on, and, if the solenoid drive operation switch 34 is turned off at this stopped position, then the solenoid driving circuit 35 demagnetizes the solenoid 19 to release the coupling between the nut member 14 and the stationary member 1 and deliver the condition identification signal CIS of the L level to the first and the second control circuits 36 and 37. Then, when delivered the condition identification signal CIS of the L level from the solenoid driving circuit 35, the second control circuit 37 discriminates the presence or absence of the restoration command signal RCS from the signal identifying circuit 32. In this case, the third switch 22A is turned on by the switch actuating protrusion 18 of the nut member 14, and the second control circuit 37, having received the restoration command signal RCS from the signal identifying circuit 32, the second control circuit 37 gear-changes the speed change clutch 16 from low speed to high speed, and thereafter, drives the motor 17 in the reverse direction via the motor driving circuit 38. At this time, since the coupling between the nut member 14 and the stationary member 1 is released, the nut member 14 is fed at high speed to the right in FIG. 1. Meanwhile, when the nut member 14 is moved to the substantially central position of the screwshaft 13, the first switch 20 is turned on by the switch actuating protrusion 18 of the nut member 14, whereby a sensing signal is delivered from the first switch 20 to the signal identifying circuit 32. Then, the signal identifying circuit 32 stops the on-off operation of either the alarm lamps 32A or 32B and delivers the restoration completion signal RFS to the second control circuit 37. The second control circuit 37 stops the motor 17 in operation via the motor driving circuit 38, and gear-changes the speed change clutch 16 from high speed to low speed, whereby the nut member 14 is automatically returned to the central position of the screwshaft 13, so that, after the movable member 2 is desirably moved to the next position to be measured, the movable member 2 can be instantaneously finely fed.

In consequence, according to this embodiment, the fine feed mechanism including the screwshaft 13 and the nut member 14 which are threadably coupled to each other, is secured to the movable member 2, the motor is secured to the screwshaft 13 and the solenoid 19 connected to the stationary member 1 is mounted to the nut member 14, respectively, the motor 17 is driven on condition that the screwshaft 13 and the nut member 14 are within the movable range, while, when the solenoid 19 is demagnetized, the motor 17 is driven in the direction in which the screwshaft 13 and the nut member 14 are returned to the neutral positions, whereby, when the solenoid 19 is demagnetized, the movable member 2 may be desirably moved relative to the stationary member 1, while, if the solenoid 19 is excited at a desired position in the whole stroke of the movable member 2, then the movable member 2 can be finely fed from this position, so that the measuring efficiency can be improved.

Furthermore, the arrangement does not cover the total length of the measuring range, so that the construction can be rendered compact in size, light in weight and low in cost. These facts, i.e. compactness and light weight are advantageous in contributing to the securing of the accuracy as a whole in the precision measuring instruments.

Additionally, in this embodiment, the fine feed mechanism 12 includes the screwshaft 13 and the nut member 14, and the coupling between the nut member 14 and the stationary member 1 is effected by the solenoid 19 provided on the nut member 14, whereby the screwshaft 13 and the nut member 14 are constantly threadably coupled to each other regardless of the switching between the rough feed and the fine feed, so that backlashes can be eliminated, thus enabling to expect the feed with high accuracy to be materialized.

Furthermore, the second switches 21A and 21B are provided at the opposite end portions of the screwshaft 13, and, when these switches 21A and 21B are turned on, the motor 17 is stopped in operation to stop the relative movement between the screwshaft 13 and the nut member 14, so that the fine feed mechanism 12 can be prevented from being damaged. Further, the third switches 22A and 22B are provided in front of the second switches 21A and 21B, and, when these switches 22A and 22B are turned on, either the alarm lamp 32A or 32B is on-off operated, whereby little allowance in the fine feed stroke can be alarmed by the on-off operation of either the alarm lamp 32A or 32B. Moreover, the on-off operation of either the alarm lamp 32A or 32B makes it possible to discriminate as to which direction little allowance in the feed stroke has occured.

Furthermore, in the condition where the second switches 22A and 22B are turned on, if the solenoid 19 is demagnetized, then the nut member 14 is automatically returned to the substantially central portion of the screwshaft 13, i.e. the neutral position where the first switch 20 is turned on, whereby the solenoid 19 is demagnetized and the fine feed mechanism 12 is automatically returned to the neutral position while the movable member 2 is roughly fed to the next point to be measured, so that there is no need to interrupt the works to perform a manual return operation. This fact means that, no matter in what position the movable member 2 may be in the whole stroke, the fine feed can be instantaneously started from this position, so that the reduction of the fine feed stroke, due to rendering of the construction of the system compact in size, can be solved. Moreover, at the time of returning to the neutral position, the speed change clutch 16 connecting the motor 17 to the screwshaft 13 is gear-changed from low speed to high speed, so that the restoration operation can be rapidly carried out.

In addition to the above, the first, second and third switches 20, 21A, 21B, 22A and 22B are made movable in the axial direction of the screwshaft 13, so that the neutral position, the range of fine feed stroke and the position for indicating the remaining stroke can be desirably set.

In working, as the fine feed mechanism 12, in addition to the combination of the screwshaft 13 and the nut member 14 as described in the above embodiment, for example, the combination of a pinion and a rack or the combination of a cylinder and a piston may be adopted. With the combination of the pinion and the rack, a clamp device should be provided while the pinion is driven by the motor or the like. Furthermore, with the combination of the cylinder and the piston, a clamp device should be provided while a fluid source, such as a pneumatic or hydraulic one, is connected to the cylinder via a change-over valve.

As the driving means, the motor 17 is desirable when the fine feed mechanism 12 is the combination of the screwshaft 13 and the nut member 14 as in the above embodiment. However, needless to say, an optimum driving source may be selected in accordance with the components of the fine feed mechanism 12.

As the clamp device, in addition to the electromagnetic coupling means such as the solenoid 19 as described in the above embodiment, any one such as a pneumatically attracting device, a mechanically locking device or the like, which, in short, can be selectively connected to or disconnected from the stationary member, may be adopted.

Furthermore, in the above embodiment, three types of switches 20, 21A, 21B, 22A and 22B have been provided. However, the third switches 22A and 22B may be omitted for example, and, such an arrangement may be adopted that, when the second switches 21A and 21B are turned on, the driving of motor 17 is reversed in rotation to automatically return the nut member 14 to the neutral position. Besides, the nut member 14 may be automatically returned to the neutral position each time the solenoid 19 is demagnetized regardless of the on-off operation of the second switches 21A, 21B and the third switches 22A, 22B. Additionally, these switches may be limit switches or photoelectric switches.

Furthermore, in the above embodiment, there have been provided only the alarm lamps 32A and 32B which are on-off operated when the third switches 22A and 22B are turned on, however, except these switches, if there are provided a lamp, which is on-off operated or turned on when the first switch 20 is turned on, and a lamp, which is on-off operated or turned on when the second switches 21A and 21B are turned on, then it becomes possible to inform of whether or not the nut member 14 is at the central position of the screwshaft 13 and whether or not the nut member 14 is at the movable limit position. Additionally, these lamps may formed of ordinary incandescent lamps, luminous diodes or the like. In this case, alarms may be given simultaneously with turn-on or turn-off of the lamps or the like.

Further, the control device 31 may be formed directly on the movable member 2 or may be provided at a position separate from the movable member 2 via a cable and the like. In passing, the direct provision of the control member 31 on the movable member 2 is advantageous in that works may be carried out while the confirmations are made in the vicinity of the work to be measured.

In addition to the above, the present invention is applicable not only to the above-described measuring instrument but also to the machine requiring the fine feed and the rough feed such for example as a machine tool.

As has been described hereinabove, the present invention can provide a fine feed system rendered compact in size and low in cost, in which the fine feed of a movable member is instantaneously performed no matter where the movable member may be positioned in its movable range.

What is claimed is:

1. A fine feed system, wherein a movable member movable relative to a stationary member is finely fed, comprising:
   a fine feed mechanism, including a first member and a second member, both of which are movable relative to each other and are secured to said movable member;
   a driving member operatively connected to said first member;
   a clamp device operable between a clamped and released conditions and provided on said second member, said clamp device, when in said clamped condition, effecting a coupling of said second member to said stationary member;
   movement regulating detector means having operable position detector elements at the ends of a range of movement for said movable member for defining a relatively movable range between said first and second members; and
   a control means for effecting an operation of said driving means and a movement of said movable member within said range when said operable position detector elements of said movement regulating detector means are not operated and for operating said driving means in a direction to return said first and said second members to an original relative position in response to said clamp device being in said released condition.

2. A fine feed system as set forth in claim 1, wherein said first member is a screwshaft, said second member is a nut member and said driving member is a motor.

3. A fine feed system as set forth in claim 2, wherein a speed change clutch, operable at a high speed connection and at a low speed connection, is operatively connected between said driving member and said screwshaft, and wherein said control means includes means for effecting operation of said speed change clutch at at least one of said high speed connection and said low speed connection, and wherein, when said screwshaft and said nut members are returned to said original relative positions, said screwshaft and said motor are connected to each other through said speed change clutch switched to said high speed connection by said control means.

4. A fine feed system as set forth in claim 1, wherein said clamp device comprises electromagnetic coupling means.

5. A fine feed system as set forth in claim 2, wherein said position detector elements for detecting the relative positions between said first and said second members are adjustable in position in a direction of relative movement.

6. A fine feed system as set forth in claim 2, wherein said position detector elements include a pair of switches for detecting the relative positions of said screwshaft and said nut member which are adjustable in position in the axial direction of said screwshaft.

7. A fine feed system as set forth in claim 6, wherein plural of said position detector elements are successively provided along the screwshaft and each of said detector elements are operated by the movement of said nut member.

8. A fine feed system as set forth in claim 1, wherein said control means includes;
a clamp device operating portion;
a fine feed operating portion;
a clamp device operating circuit for operating said clamp device in said clamped condition when said clamp device operating portion is operated;
a first control circuit for causing said driving means to operate on condition that said position detector elements of said movement regulating detector means have not operated and said clamp device is in said clamped condition when said fine feed operating portion is operated; and
a second control circuit for causing said driving means to operate in a direction in which said first and said second members are returned to said original relative positions when said clamp device is in said released condition.

9. A fine feed system as set forth in claim 5, wherein said control means includes;
a clamp device operating portion;
a fine feed operating portion;
a clamp device driving circuit for operating said clamp device in said clamped condition when said clamp device operating portion is operated;
an alarm lamp;
a signal identifying circuit for on-off operating or turning on said alarm lamp when at least one of said position detector elements is operated;
a first control circuit for causing said driving means to operate on condition that said position detector elements of said movement regulating detector means have not operated and said clamp device is in said clamped condition when said fine feed operating portion is operated; and
a second control circuit for causing said driving means to operate in a direction in which said screwshaft and said nut member are returned to said original relative positions on condition that said position detector elements have not operated and said clamp device is in said released condition.

10. In a fine feed system wherein a movable member is movable relative to and along a stationary member and said movable member is finely fed relative to said stationary member through a fine feed mechanism including two members movable relative to each other, the improvement comprising wherein:
said fine feed mechanism includes a screwshaft and a nut member threadably coupled to said screwshaft, said screwshaft being provided on said movable member;
a motor for rotatably driving said screwshaft;
a speed change clutch is operatively connected between said motor and said screwshaft;
said nut member has affixed thereto an electromagnetic means for coupling and uncoupling said nut member to said stationary member; and further
movement regulating detector means having operable position detector elements at the ends of a range of movement for said movable member for defining a relatively movable range between said screwshaft and said nut member;
a control means is provided for driving said driving means at low speed and at a high speed, said driving means driving at said low speed where a pair of said position detector elements regulate the relatively movable range between said screwshaft and said nut member said which have not operated, said driving means driving at a high speed for returning said screwshaft and said nut member to said original relative positions in response to said electromagnetic coupling means being uncoupled from said stationary member.

11. A fine feed system as set forth in claim 10, wherein said position detector elements for detecting the relative positions of said screwshaft and said nut member are adjustable in position in the direction of relative movement.

12. A fine feed system as set forth in claim 11, wherein plural of said position detector elements are successively provided along said screwshaft and operated by the movement of said nut member as it moves adjacent thereto.

13. A fine feed system as set forth in claim 10, wherein said control means includes:
a clamp device operating portion;
a fine feed operating portion;
a clamp device driving circuit operable for operating said electromagnetic coupling means in a coupled condition when said clamp device operating portion is operated;
a first control circuit for causing said driving means to operate on condition that said position detector elements of said movement regulating detector means have not operated and said electromagnetic coupling means is in said coupled condition when said fine feed operating portion is operated; and
a second control circuit for causing said driving means to operate in a direction in which said screwshaft and said nut member are returned to said original relative positions when said clamp device is in said uncoupled condition.

14. A fine feed system as set forth in claim 13, wherein an alarm lamp is provided; and wherein said control means further includes a signal identifying circuit for activating said alarm lamp when at least one of said position detector elements is operated.

* * * * *

UNITED STATES PATENT AND TRADEMARK OFFICE
CERTIFICATE OF CORRECTION

PATENT NO. : 4 577 142

DATED : March 3, 1986

INVENTOR(S) : Sadayuki Matsumiya

It is certified that error appears in the above-identified patent and that said Letters Patent is hereby corrected as shown below:

Column 10, line 26; change "said" (second occurrence) to ---and---.

Signed and Sealed this

Thirtieth Day of September 1986

[SEAL]

Attest:

DONALD J. QUIGG

Attesting Officer

Commissioner of Patents and Trademarks